United States Patent
Horii et al.

(10) Patent No.: US 7,154,553 B2
(45) Date of Patent: Dec. 26, 2006

(54) COMPOSITE SYSTEM CAPABLE OF SWITCHING BETWEEN SEPARATE POWER SOURCES

(75) Inventors: Hiroyuki Horii, Kanagawa (JP); Kazunori Arima, Kanagawa (JP); Toshiya Kondoh, Kanagawa (JP); Koji Kawamura, Kanagawa (JP); Kenichi Inadomi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1301 days.

(21) Appl. No.: 09/946,488

(22) Filed: Sep. 6, 2001

(65) Prior Publication Data

US 2002/0034387 A1   Mar. 21, 2002

(30) Foreign Application Priority Data

Sep. 12, 2000  (JP) .............................. 2000-277080

(51) Int. Cl.
   *H04N 5/225*   (2006.01)
(52) U.S. Cl. .................... 348/372; 348/207.2; 396/301
(58) Field of Classification Search ............. 348/207.2, 348/372, 374, 301
   See application file for complete search history.

(56) References Cited

U.S. PATENT DOCUMENTS

| | | | | |
|---|---|---|---|---|
| 3,810,212 A | * | 5/1974 | Biber | 396/206 |
| 5,210,568 A | * | 5/1993 | Miyake et al. | 396/303 |
| 5,784,629 A | * | 7/1998 | Anderson et al. | 713/340 |
| 5,943,097 A | | 8/1999 | Horii | 348/441 |
| 5,978,609 A | * | 11/1999 | Aoki | 396/429 |
| 6,018,363 A | | 1/2000 | Horii | 348/219 |
| 6,091,909 A | * | 7/2000 | McIntyre et al. | 396/278 |
| 6,101,339 A | * | 8/2000 | Miki et al. | 396/301 |
| 6,529,690 B1 | * | 3/2003 | Miyazaki et al. | 396/536 |
| 6,580,460 B1 | * | 6/2003 | Takahashi et al. | 348/372 |
| 6,661,462 B1 | * | 12/2003 | Ohnogi | 348/372 |
| 6,909,456 B1 | * | 6/2005 | Sasaki | 348/207.2 |
| 7,046,294 B1 | * | 5/2006 | Sasaki | 348/372 |

OTHER PUBLICATIONS

U.S. Appl. No. 08/352,518, filed Dec. 9, 1994.
U.S. Appl. No. 09/948,631, filed Sep. 10, 2001.
U.S. Appl. No. 09/946,488, filed Sep. 6, 2001.

* cited by examiner

*Primary Examiner*—Ngoc-Yen Yu
*Assistant Examiner*—Gary C. Vieaux
(74) *Attorney, Agent, or Firm*—Fitzpatrick, Cella, Harper & Scinto

(57) ABSTRACT

A composite system includes first and second devices, each operated using its own power source device as a driving source. The system comprises a signal line connecting loads of the first and second devices so that the first and second devices operate in cooperation with each other; and a power source line connecting a first line connecting the first power source device and the load of the first device via a diode and a second line connecting the second power source device and the load of the second device via a diode so that the first and second devices can operate using the power source device of the counterpart device as the drive source.

26 Claims, 17 Drawing Sheets

COMPOSITE SYSTEM CAPABLE OF SWITCHING BETWEEN SEPARATE POWER SOURCES

This application is based on patent application Ser. No. 2000-277080 filed Sep. 12, 2000 in Japan, the content of which is incorporated hereinto by reference.

BACKGROUND OF THE INVENTION

1. Field of the Invention

The present invention relates to a composite system, in which a plurality of devices, each respectively actuated using its own power source as a driving source, are actuated in cooperated with each other.

2. Description of the Related Art

Conventionally, in a composite system, in which a plurality of devices are connected and respective devices are actuated in cooperation, when a plurality of first and second devices are combined for cooperation, respective devices are actuated using own independent power sources as driving sources.

As a result, when a battery as a power source of one device is dead, not only one device having the dead battery but also an entire composite system becomes impossible to use. This is particularly significant when the composite system is a portable type and a supply source as a power source is limited to a battery or the like to cause a significant inconvenience.

On the other hand, while an AC adapter may be used as a replacement of the battery, AC adapters have to be provided for respective devices, which causes their use to be troublesome or to require high cost.

SUMMARY OF THE INVENTION

An object of the present invention is to solve the problem in the prior art and to provide a composite system which can be continuously used as long as possible as an entire system.

Another object of the present invention is to provide a composite system which can eliminate complexity and permit reducing costs.

In a first aspect of the present invention, there is provided a composite system including a first device operated with taking an own first power source device as a driving source and a second device operated with taking an own second power source device as a driving source, comprising:

connecting means for connecting the first device and the second device so that at least the first and second devices operate in cooperation with each other; and power source device connecting means for connecting the first power source device and the second power source device so that at least the first device and the second device may operate with taking the power source device of the counterpart device as a driving source.

Here, the composite system may further comprise:

switching means for permitting the first device and the second device to switch between its own power source device and the power source device of the counterpart device as the driving source.

The composite system may further comprise:

state judgment means for making a judgment of states of the first power source device and the second power source device; and actuation means for actuating the switching means on the basis of a result of a judgment of the state judgment means.

In a second aspect of the present invention, there is provided a composite system including a first device operated with taking an own first power source device as a driving source and a second device operated with taking an own second power source device as a driving source, comprising:

a signal line connecting loads of the first device and the second device so that at least the first device and the second device operate in cooperation with each other; and a power source line connecting a first line connecting the first power source device and the load of the first device via a diode and a second line connecting the second power source device and the load of the second device via a diode so that at least the first device and the second device can operate with taking the power source device of the counterpart device as the drive source.

In a third aspect of the present invention, there is provided a composite system including a first device operated with taking an own first power source device as a driving source and a second device operated with taking an own second power source device as a driving source, comprising:

signal line connecting loads of the first device and the second device so that at least the first device and the second device operate in cooperation with each other;

power source line connecting a first line connecting the first power source device and the load of the first device via a diode and a second line connecting the second power source device and the load of the second device via a diode so that at least the first device and the second device can operate with taking the power source device of the counterpart device as the drive source; and a first switch interposed in the first line, a second switch interposed in the second line and third and fourth switches interposed in the power source line so as to permit the first device and the second device for switching between the own power source device and the power source device of the counterpart device as the driving source.

In a fourth aspect of the present invention, there is provided a composite system including a first device operated with taking an own first power source device as a driving source and a second device operated with taking an own second power source device as a driving source, comprising:

a signal line connecting loads of the first device and the second device so that at least the first device and the second device operate in cooperation with each other;

a power source line connecting a first line connecting the first power source device and the load of the first device via a diode and a second line connecting the second power source device and the load of the second device via a diode so that at least the first device and the second device can operate with taking the power source device of the counterpart device as the drive source;

a first switch interposed in the first line, a second switch interposed in the second line and third and fourth switches interposed in the power source line so as to permit the first device and the second device for switching between the own power source device and the power source device of the counterpart device as the driving source;

a first A/D converter disposed between a junction between the first diode and the first switch and the first load, a second A/D converter disposed between a junction between the second diode and the second switch and the second load, and third and fourth A/D converters disposed between a junction between the third and fourth switches and the first and second loads, respectively; and actuation means for switchably actuating the first to fourth switches.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Hereinafter embodiments of the present invention will be explained with reference to the drawings.

In the present specification, "printing" (also referred to as "recording" in some cases) means not only a condition of forming significant information such as characters and drawings, but also a condition of forming images, designs, patterns, and the like on printing mediums broadly or a condition of processing the printing mediums, regardless of significance or lack of meaning or of being actualized in such manner that can be visually perceived by a human.

Also, a "Printer" and a "recording apparatus" mean not only one complete apparatus for carrying out a printing but also an apparatus having a function for printing.

Further, the "printing medium" means not only paper used in a conventional printing apparatus but also everything capable of accepting inks, such as fabrics, plastic films, metal plates, glass, ceramics, wood and leather, and in the following, will be also represented by a "sheet" or simply by "paper".

Further, in the present specification, a "camera" indicates an apparatus or device that optically photographs an image and converts the photographed image into electrical signals, and in the following explanation, is also referred to as a "photographing section".

Still further, an "ink" (also referred to as "liquid" in some cases) should be interpreted in a broad sense as well as a definition of the above "printing" and thus the ink, by being applied on the printing mediums, shall mean a liquid to be used for forming images, designs, patterns and the like, processing the printing medium or processing inks (for example, coagulation or encapsulation of coloring materials in the inks to be applied to the printing mediums).

Meantime, one embodiment of a head to which the present invention is advantageously employed is the embodiment in which a thermal energy generated by an electrothermal converter is utilized to cause film boiling in the liquid resulting in a formation of bubbles.

[Basic Structure]

Firstly, a basic structure of a device according to the present invention will be explained in view of FIGS. 1 to 14. The device explained in the present embodiments is constituted as information processing equipment comprising a photographing section for optically photographing an image and then converting the photographed image into electric signals (hereinafter, also referred to as "camera section") and an image recording section for recording an image on the basis of thus obtained electric signals (hereinafter, also referred to as "printer section"). Hereinafter, the information processing equipment in the present embodiments is explained using the terminology "printer-built-in camera".

Figure 5:
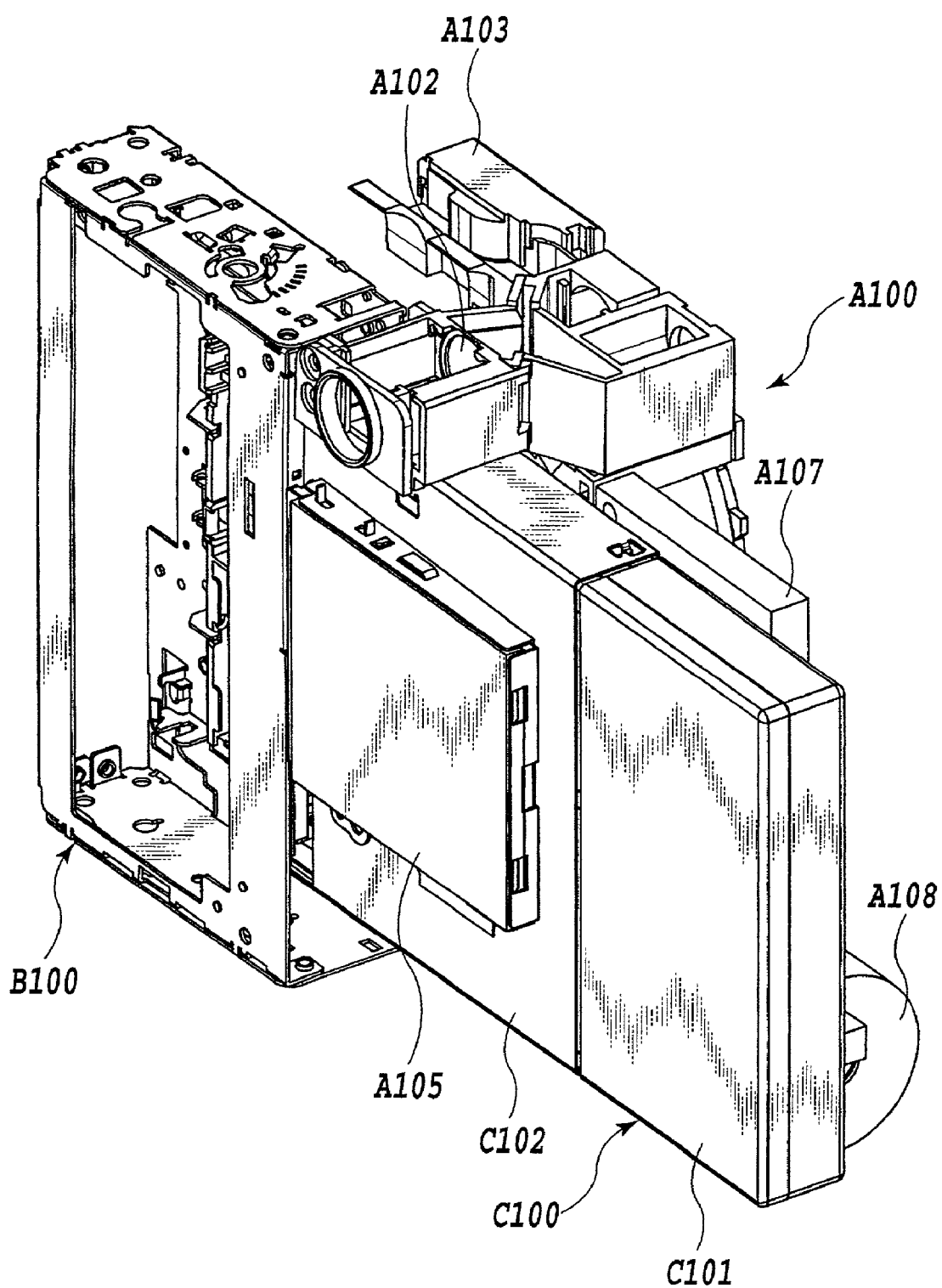
FIG. 5 is a perspective view showing an arrangement of the main components within the camera in FIG. 1.

In a main body A001, there is incorporated a printer section (recording apparatus section) B100 at the backside of a camera section A100 in an integral manner. The printer section B100 records an image by using inks and printing mediums which are supplied from a medium pack C100. In the present structure, as apparent from FIG. 5 illustrating the main body A001 viewing from the backside with an outer package removed, the medium pack C100 is inserted at the right hand of the main body A001 in FIG. 5 and the printer section B100 is arranged at the left hand of the main body A001 in FIG. 5. In the case of performing a recording by the printer section B100, the main body A001 can be placed facing a liquid crystal display section A105 up and a lens A101 down. In this recording position, a 15 recording head B120 of the printer section B100, which will be described below, is made to be positioned to eject inks in the downward direction. The recording position can be made to be the same position as that of photographing condition by the camera section A100 and thus is not limited to the recording position as mentioned above. However, in view of a stability of a recording operation, the recording position capable of ejecting the inks in the downward direction is preferred.

There follows the explanations of the basic mechanical structure according to the present embodiment under the headings of 1 as "Camera Section", 2 as "Medium Pack" and 3 as "Printer Section", and of the basic structure of the signal processing under the heading of 4 as "Signal Processing".

1: Camera Section

Figure 1:
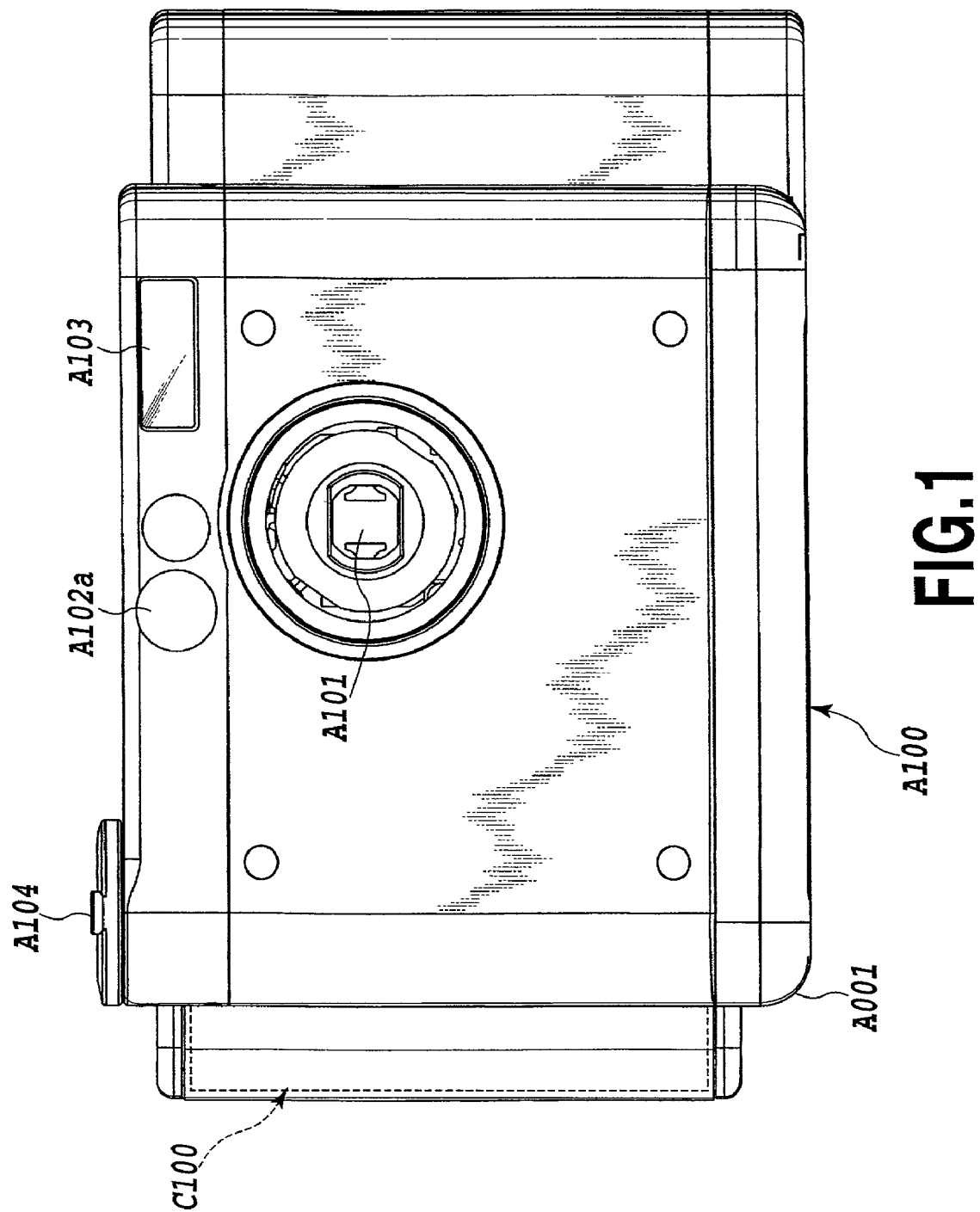
FIG. 1 is a front elevation view of a printer-built-in camera to which the present invention is applicable.
Figure 2:
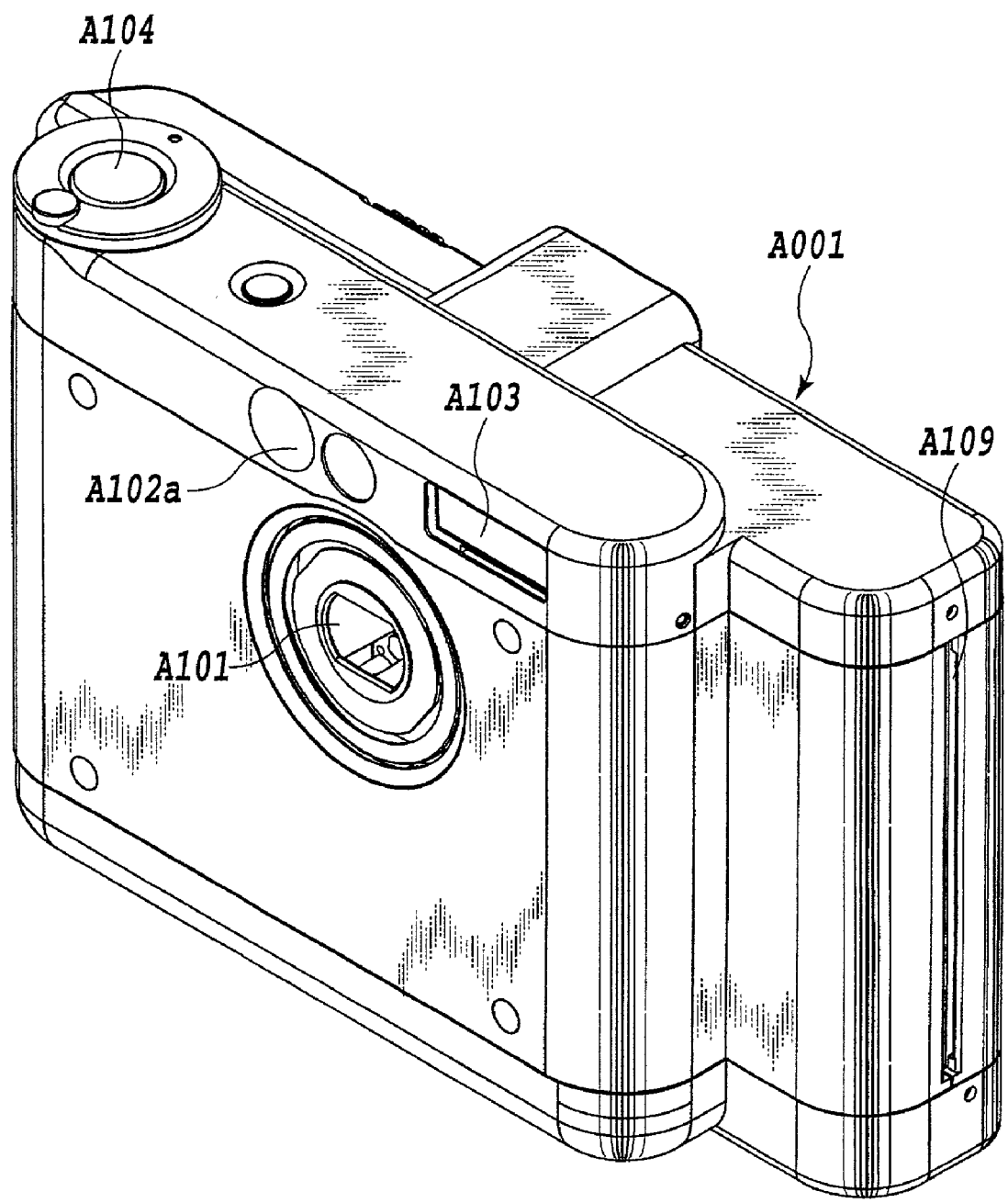
FIG. 2 is a perspective view of the camera in FIG. 1 viewing diagonally from the front thereof.
Figure 3:
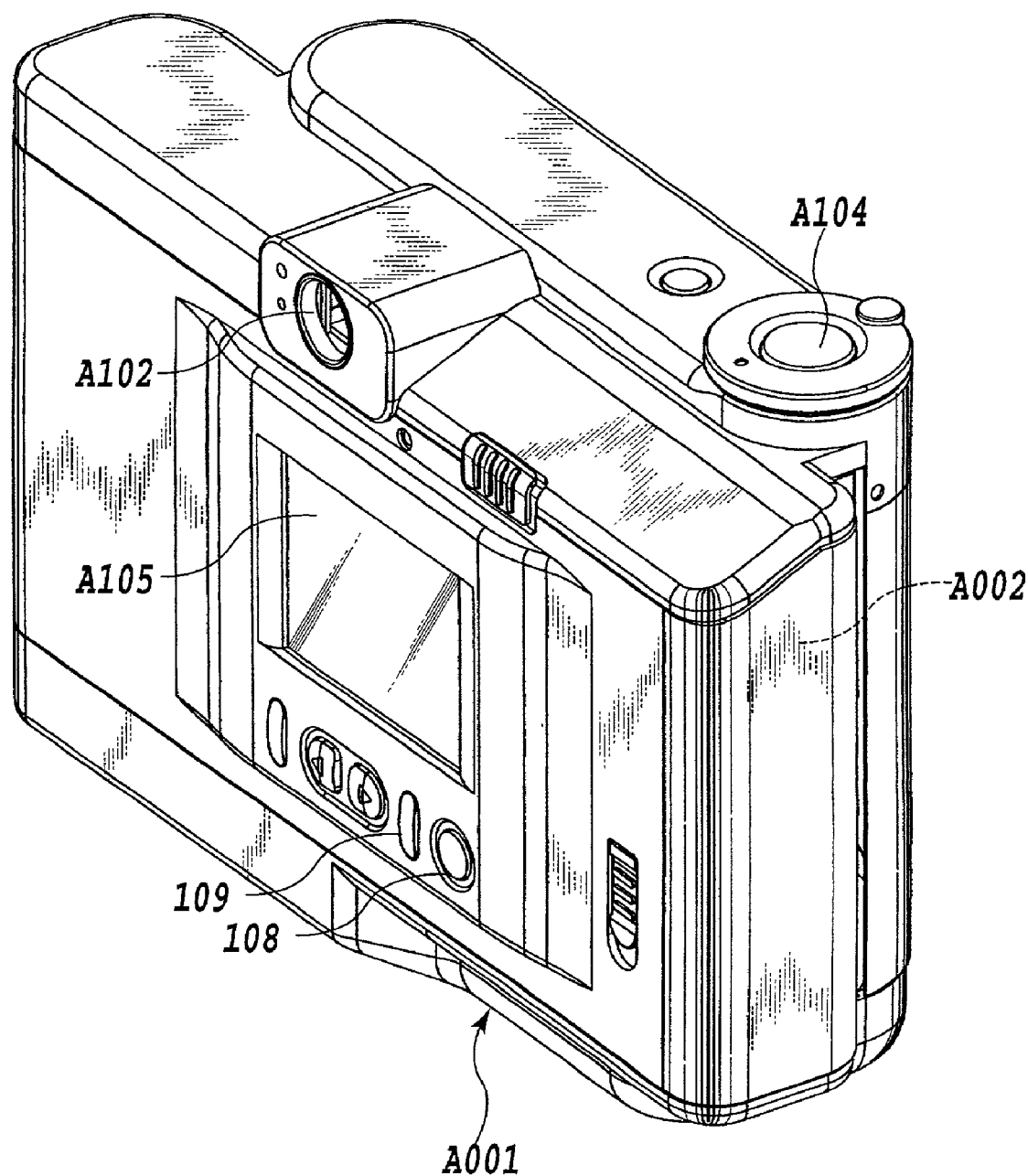
FIG. 3 is a perspective view of the camera in FIG. 1 viewing diagonally from the back thereof.

The camera section A100, which basically constitutes a conventional digital camera, constitutes the printer-built-in digital camera having an appearance in FIGS. 1 to 3 by being integrally incorporated into the main body A001 together with a printer section B100 described below. In FIGS. 1 to 3, A101 denotes a lens; A102 denotes a viewfinder; A102a denotes a window of the viewfinder; A103 denotes a flash; A104 denotes a shutter release button; and A105 denotes a liquid crystal display section (outer display section). The camera section A100, as described below, performs a processing of data photographed by a CCD a recording of the images to a compact flash memory card (CF card) A107, a display of the images and a transmission of various kinds of data with the printer section B100. A109 denotes a discharge part for discharging a printing medium C104 on which the photographed image is recorded. A108, as shown in FIG. 5, is a battery as a power source for the camera section A100 and the printer section B100.

2: Medium Pack

Figure 4:
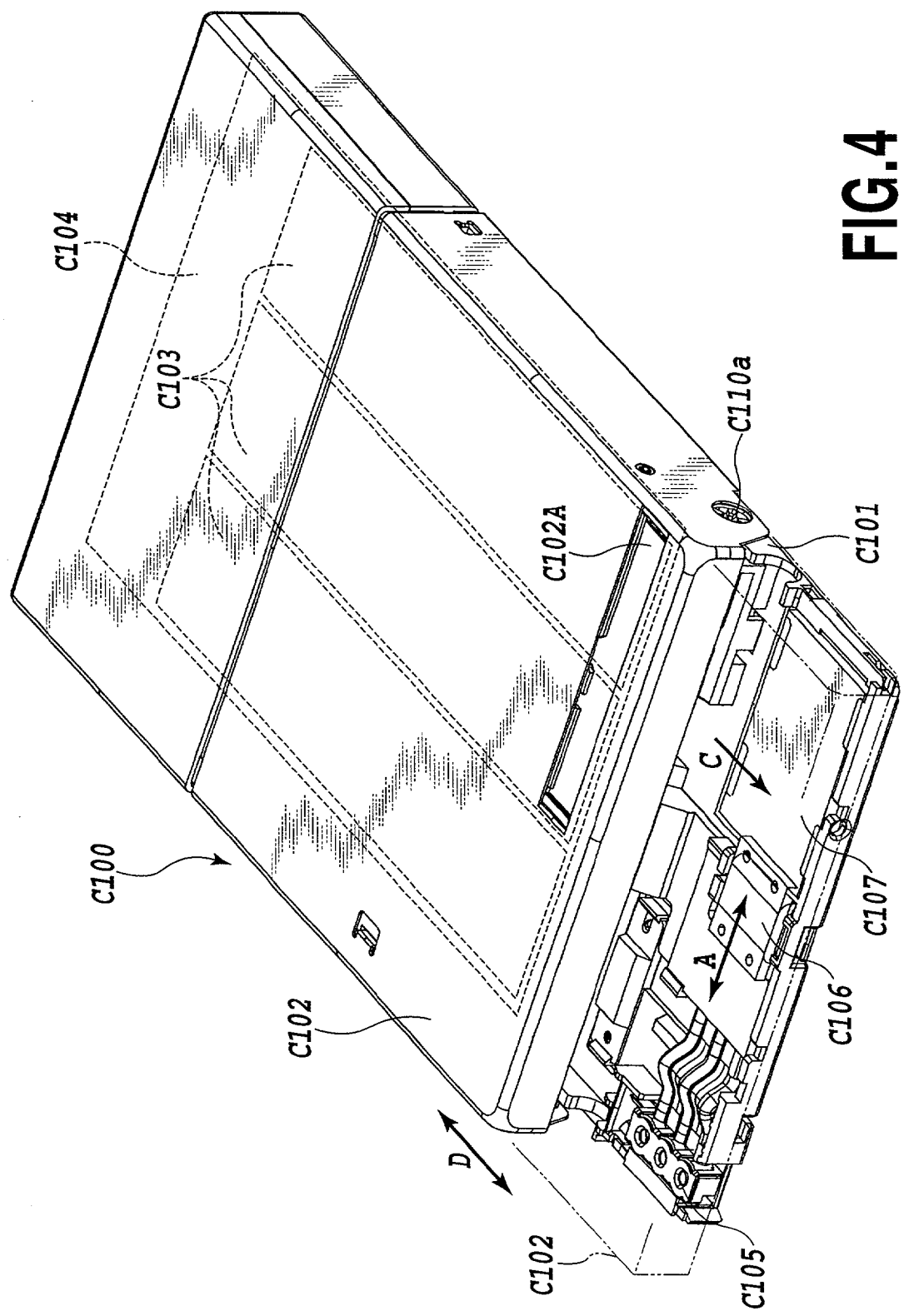
FIG. 4 is a perspective view of a medium pack insertable to the camera in FIG. 1.

A medium pack C100 is detachable relative to a main body A001 and, in the present embodiment, is inserted through an inserting section A002 of the main body A001 (see FIG. 3), thereby being placed in the main body A001 as shown in FIG. 1. The inserting section A002 is closed as shown in FIG. 3 when the medium pack C100 is not inserted therein, and is opened when the medium pack is inserted therein. FIG. 5 illustrates a status wherein a cover is removed from the main body A001 to which the medium pack C100 is inserted. As shown in FIG. 4, a shutter C102 is provided with a pack body C101 of the medium pack C100 in such manner as to be slidable in an arrow D direction. The shutter C102, which slides to stay at a position indicated by the two-dots-and-dashed lines in FIG. 4 when the medium pack C100 is not inserted in the main body A001, slides to a position indicated by the solid lines in FIG. 4 when the medium pack C100 is placed in the main body A001.

The pack body C101 contains ink packs C103 and printing mediums C104. In FIG. 4, the ink packs C103 are held under the printing mediums C104. In the case of the present embodiment, three ink packs C103 are provided so as to separately hold the inks of Y (yellow), M (magenta) and C (cyan), and about twenty sheets of the printing mediums C104 are stored in a stack. A suitable combination of those inks and the printing mediums C104 for recording an image is selected to be stored within the medium pack C100. Accordingly, the various medium packs C100 each having a different combination of the inks and the printing mediums (for example, medium packs for super high-quality image; for normal image; and for sealing (seal partitioning)) are prepared and, according to a kind of images to be recorded and a use of the printing medium on which an image is formed, those medium packs C100 are selectively inserted in the main body A001, thereby being able to perform an ensured recording of the images in compliance with the purpose by employing the most suitable combination of the ink and the printing medium. Further, the medium pack C100 is equipped with the below-mentioned EEPROM to which is recorded the identification data such as kinds or remaining amounts of the inks and the printing mediums contained in the medium pack.

The ink pack C103, upon the medium pack C100 being inserted in the main body A001, is connected to an ink supplying system in the main body A001, through three joints C105, each corresponding to the respective inks of Y, M and C. On the other hand, the printing mediums C104 are separated one by one using a separating mechanism (which is not shown in the figures) and then sent to a direction of an arrow C by a paper feeding roller C110 (see FIG. 9). A driving force of the paper feeding roller C110 is supplied from a later-described conveying motor M002 (see FIG. 9) provided on the main body A001 through a connecting portion C110a.

Further, the pack body C101 comprises a wiper C106 for wiping a recording head of the after-mentioned printer section, and an ink absorption body C104 for absorbing the waste inks discharged from the printer section. The recording head in the printer section reciprocates in a direction of the main scanning direction as indicated by an arrow A in such manner described below. When the medium pack C100 is in the status of being removed from the main body A001, the shutter C102 slides to a position indicated by the two-dots-and-dashed lines in FIG. 4 to protect the joints C105, the wiper C106, the ink absorbing body C107 and so on.

3: Printer Section

The printer section B100 according to the present embodiment is a serial type employing an ink jet recording head. This printer section B100 is explained under the headings of 3-1 "Printing Operating Section"; 3-2 "Printing Medium Carrying"; and 3-3 "Ink Supplying System", respectively.

3-1: Printing Operating Section

Figure 6:
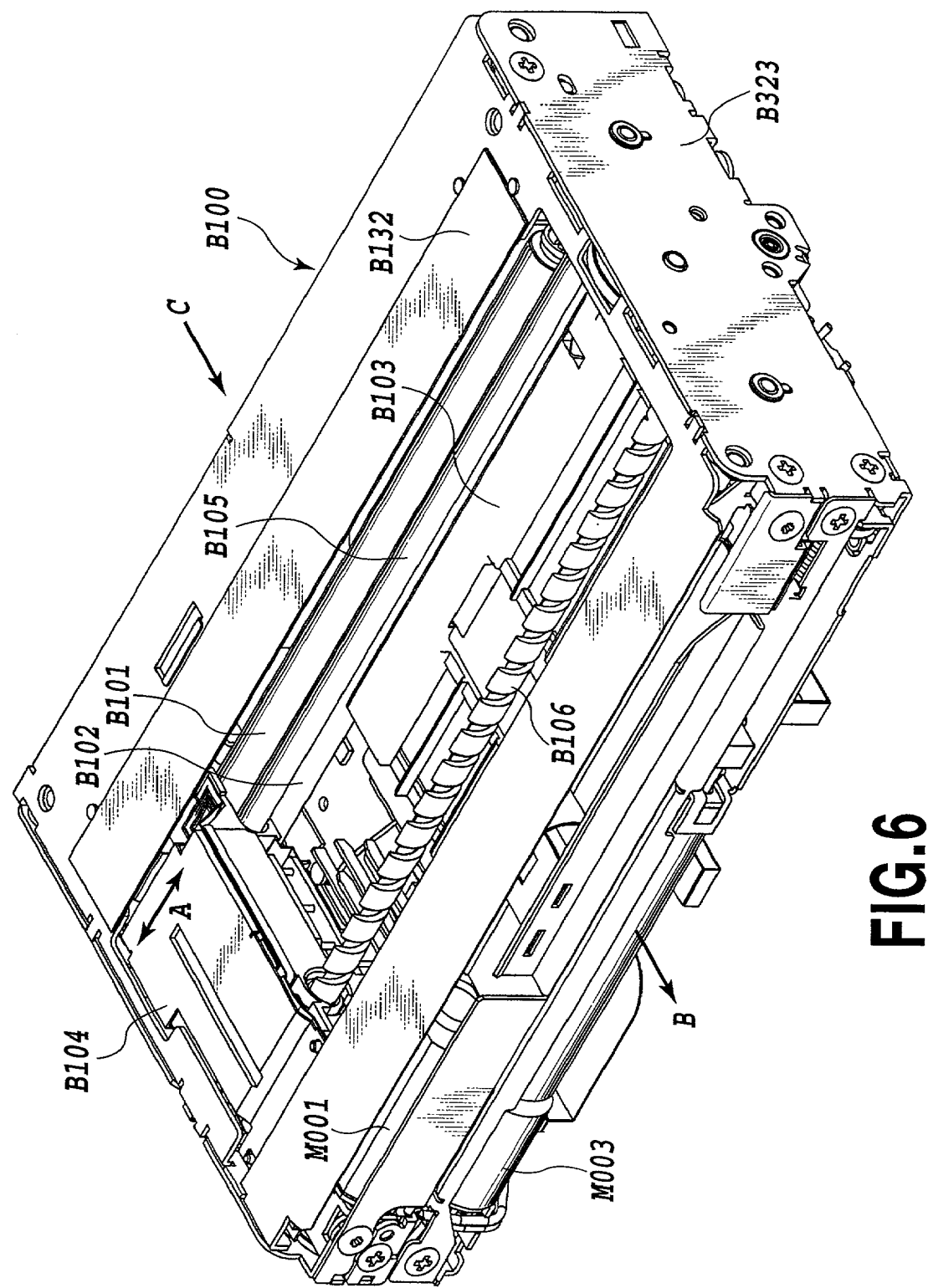
FIG. 6 is a perspective view of a printer section in FIG. 5.
Figure 7:
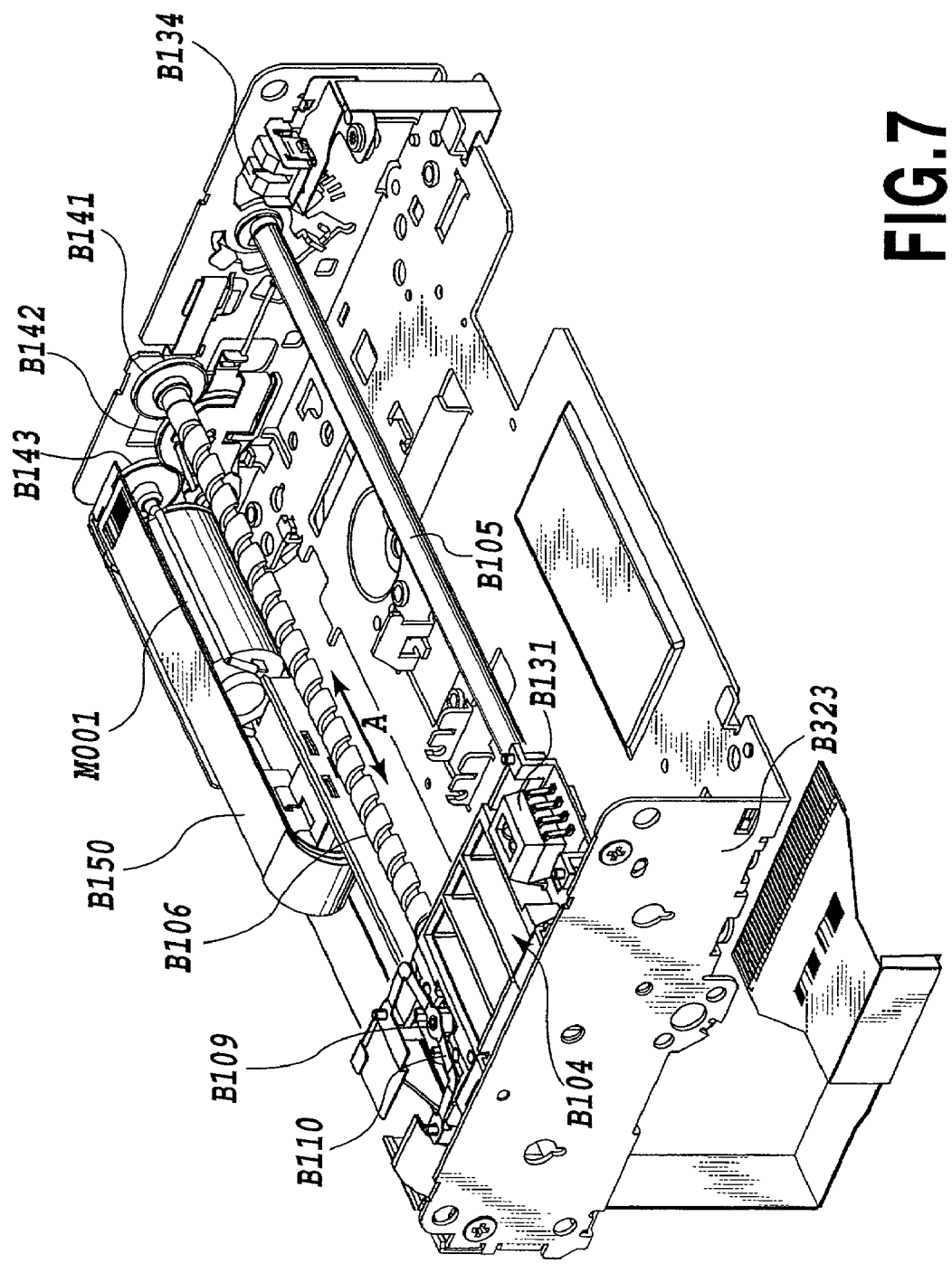
FIG. 7 is a perspective view in which a portion of the printer section in FIG. 6 is dislodged.

FIG. 6 is a perspective view illustrating the entire printer section B100, and FIG. 7 is a perspective view illustrating the printer section B100 with a part partially taken out.

At a predetermined position in the main body of the printer section B100, a tip portion of the medium pack C100 is positioned when the medium pack C100 is placed in the main body A001 as shown in FIG. 5. The printing medium C104 sent to the direction of an arrow C from the medium pack C100, while being sandwiched between a LF roller B101 and a LF pinch roller B102 of the below-mentioned printing medium carrying system, is carried to the sub-scanning direction indicated by an arrow B on a pressure plate B103. B104 denotes a carriage which reciprocates toward a main scanning direction indicated by an arrow A along a guiding shaft B105 and a leading screw B106.

Figure 8:
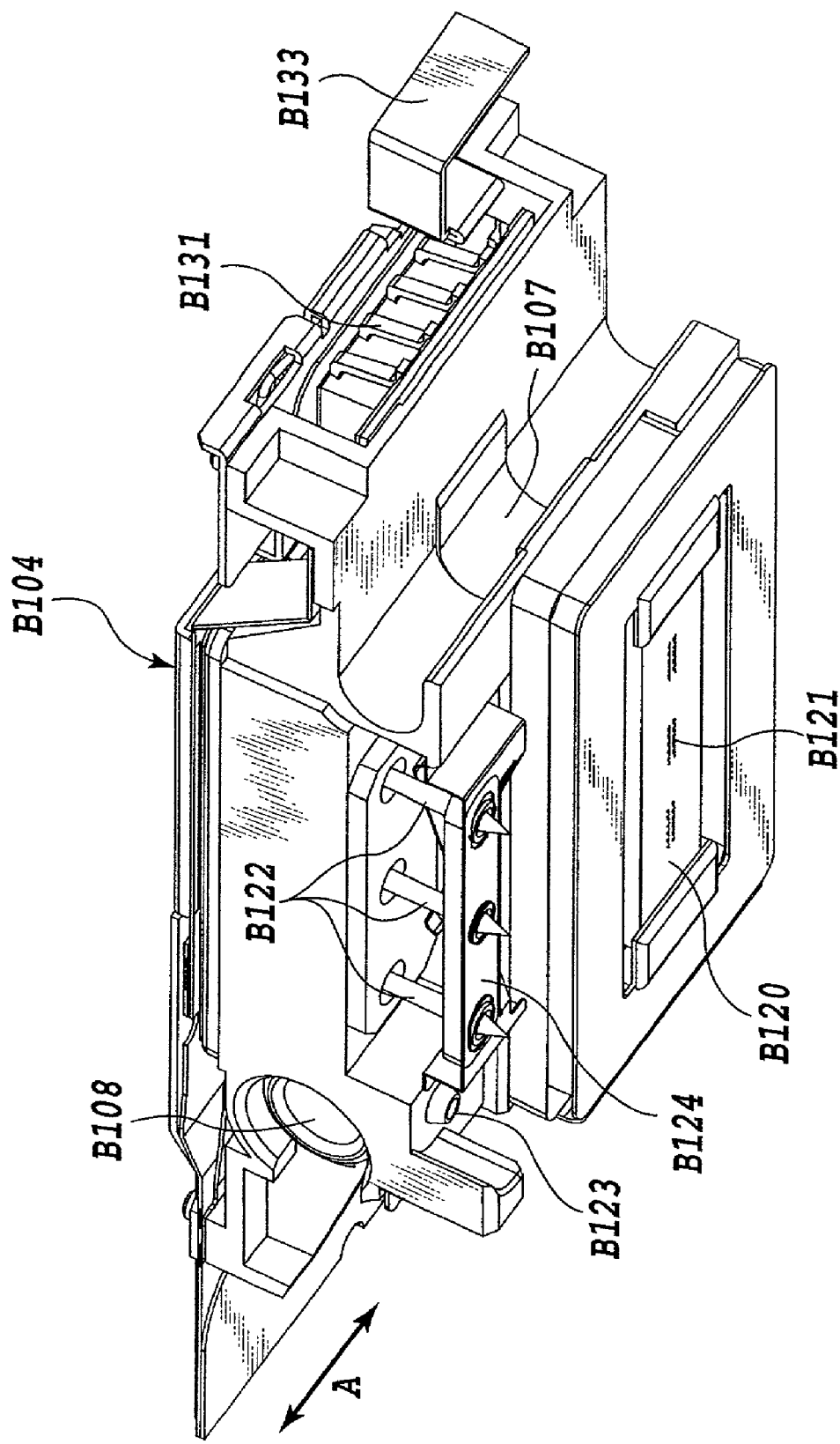
FIG. 8 is a perspective view of a carriage of the printer in FIG. 6.

As shown in FIG. 8, the carriage B104 is provided with a bearing B107 for a guiding shaft B105 and a bearing B108 for a leading screw B106. At a fixed position of the carriage B104, as shown in FIG. 7, a screw pin B109 projecting toward an interior of the bearing B108 is installed by a spring B110. A fit of a tip of the screw pin B109 to a helical thread formed on the outer circumference of the leading screw B106 converts a rotation of the leading screw B106 to a reciprocating movement of the carriage B104.

The carriage B104 is equipped with an ink jet recording head B120 capable of ejecting the inks of Y, M and C, and a sub-tank (not shown) for reserving inks to be supplied to the recording head B120. On the recording head B120, a plurality of ink ejection openings B121 (see FIG. 8), which are aligned with the direction crossing with the main scanning direction indicated by the arrow A (in the present embodiment, an orthogonal direction), are formed. The ink ejection openings B121 form nozzles capable of ejecting inks supplied from the sub-tank. As a generating means of energy for discharging the inks, an electro-thermal converting element equipped with each of the nozzles may be used. The electro-thermal converting element generates bubble in the inks within the nozzle by a heating and thus generated foaming energy causes an ejection of the ink droplet from the ink ejection opening B121.

The sub-tank has a capacity smaller than the ink packs C103 contained in the media pack C100 and made to be a sufficient size for storing a required amount of ink for recording an image corresponding to at least one sheet of printing medium C104. In the sub-tank, there are ink reserving sections for each of the inks of Y, M and C, on each of which is formed the ink supplying section and the negative pressure introducing sections, wherein those ink supplying sections are individually connected to the corresponding three hollow needles B122 and those negative pressure introducing sections are also connected to a common air suction opening B123. Such ink supplying sections, as will be mentioned below, are supplied with inks from the ink packs C103 in the medium pack C100 when the carriage B104 moves to a home position as illustrated in FIG. 6.

In the carriage B104 in FIG. 8, B124 denotes a needle cover which is moved to a position for protecting the needles B122 by the force of the springs as illustrated in FIG. 8 when the needles B122 and the joints C105 are not mated with each other, and which releases a protection of the needles B122 by being pushed upwardly against the force of the springs in FIG. 8 when the needles B122 and the joints C105 are mated with each other. A movement position of the carriage B104 is detected by an encoder sensor B131 on the carriage B104 and a linear scale B132 (see FIG. 6) on the main body of the printer section B100. Also, a fact that the carriage B104 moves to the home position is detected by a HP (home position) flag B133 on the carriage B104 and a HP sensor B134 (see FIG. 7) on the main body of the printer section B100.

In FIG. 7 at both ends of the guiding shaft B105, supporting shafts (not shown) are provided at a position eccentric to the center axis of the guiding shaft. The guiding shaft B105 is turned and adjusted upon the supporting shaft, thereby controlling a height of the carriage 104, resulting in achieving an adjustment of a distance between the recording head B120 and the printing medium C104 on the pressure plate B103. The leading screw B106 is rotatably driven by a carriage motor M001 through a screw gear B141, an idler gear B142 and a motor gear B143. B105 denotes a flexible cable for electrically connecting the after-mentioned controlling with the recording head B120.

The recording head B120 moves together with the carriage B104 toward the main scanning direction indicated by the arrow A and concurrently ejects the inks from the ink ejection openings B121 in accordance with the image signals, thereby recording an image corresponding to one band on the printing medium on the pressure plate B103. An alternate repeat of a recording operation of an image corresponding to one band by such recording head B120 and a conveying operation of the predetermined amount of the printing medium toward the sub-scanning direction indicated by the arrow B by means of the below-mentioned printing medium conveying system enables a sequential recording of the images on the printing medium.

3-2: Printing Medium Carrying

Figure 9:
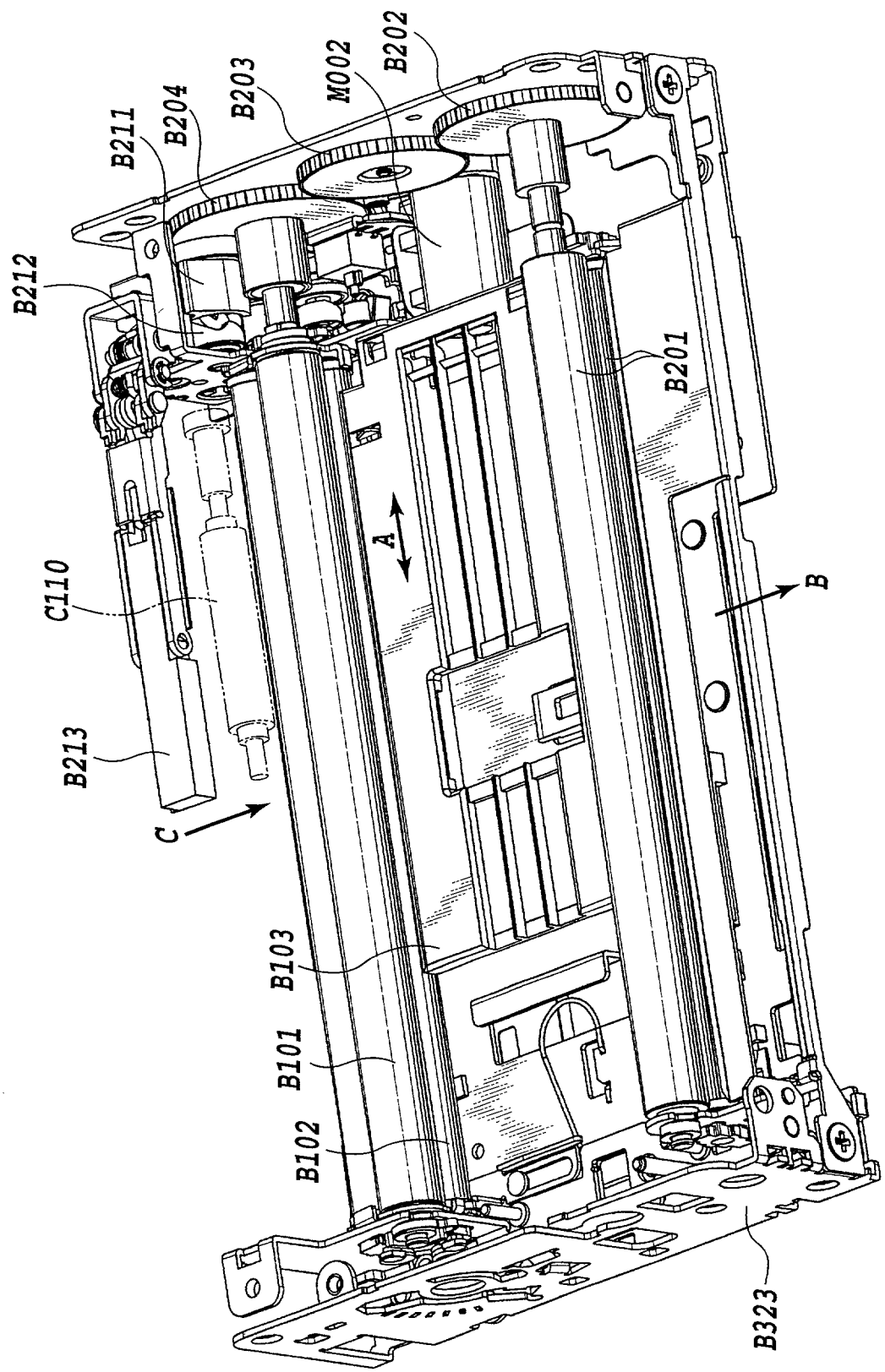
FIG. 9 is a perspective view of a component part of a printing medium carrying of the printer section in FIG. 6.

FIG. 9 is a perspective view showing a component of the printing medium conveying system of the printer section B100. In FIG. 9, B201 denotes a pair of paper delivering rollers, and the upper one of the paper delivering rollers B201 in FIG. 9 is driven by a conveying motor M002 through the paper delivering roller gear B202 and a junction gear B203. Likewise, the aforementioned LF roller B101 is driven by the conveying motor M002 through a LF roller gear B204 and the junction gear B203. The paper delivering roller B201 and the LF roller B101 convey the printing medium C104 toward the sub-scanning direction indicated by the arrow B by a driving force of the conveying motor M002 rotating in the forward direction.

On the other hand, when the conveying motor M002 couterrotates, a pressure plate head B213 and a locking mechanism which is not shown are driven through a switching slider B211 and a switching cam B212, while a driven force is transmitted to the paper feeding roller C110 on the medium pack C100. That is, the pressure plate head B213 pressurizes the printing mediums C104, which are piled up within the medium pack C100, in a downward direction in FIG. 4 by a driven force caused by a reverse rotation of the carrying motor M002, through a window portion C102A (see FIG. 4) of a shutter C102 of the medium pack C100. As a result thereof, the printing medium C104 positioned at the lowest position in FIG. 4 is pressed against the feeding roller C110 in the medium pack C100. Also, the locking mechanism which is not shown locks the medium pack C100 to the main body A001 to inhibit a removal of the medium pack C100. The feeding roller C110 of the medium pack C100 feeds one piece of the printing medium C104 at the lowest position in FIG. 4 toward the direction indicated by the arrow C as a result that the driven force caused by the reverse rotation of the conveying motor M002 is transmitted.

As stated above, only one piece of printing medium C104 is taken out from the medium pack C100 toward the direction indicated by the arrow C by the reverse rotation of the conveying motor M002, and then a forward rotation of the conveying motor M002 conveys the printing medium C104 to the direction indicated by the arrow B.

3-3: Ink Supplying System

Figure 10:
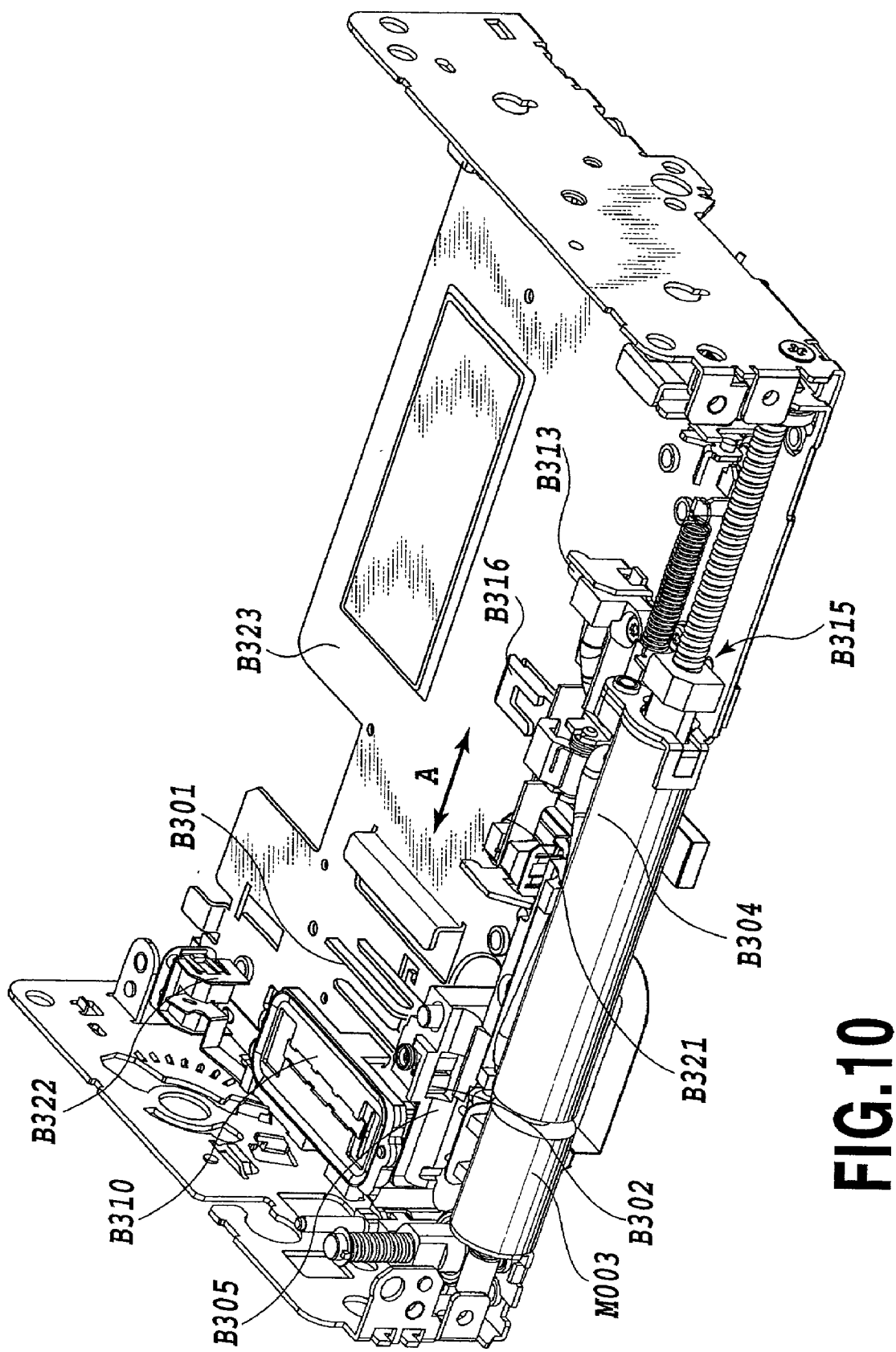
FIG. 10 is a perspective view of a component part of the ink supplying of the printer section in FIG. 6.
Figure 11:
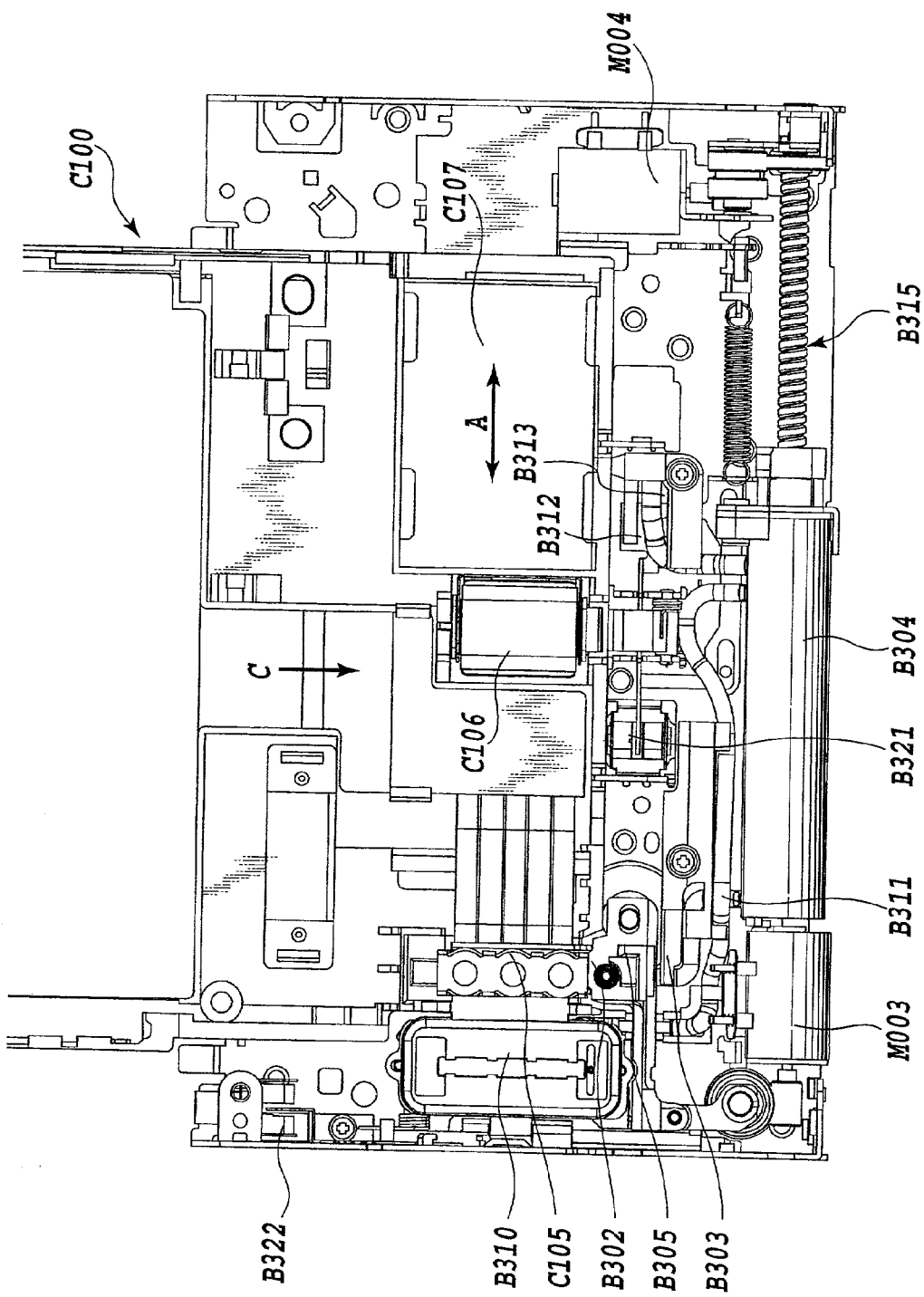
FIG. 11 is a plan view illustrating that the medium pack is inserted into a component part of the ink feeding in FIG. 10.

FIG. 10 is a perspective view showing a component part of an ink supplying system of the printer section B100: FIG. 11 is a plane view showing a status that the medium pack C100 is inserted in the component part of the ink supplying system.

A joint C105 of the medium pack C100 installed in the printer section B100 is positioned below the needles B122 (see FIG. 8) on the carriage B104 moved to a home position. The main body of the printer section B100 is equipped with a joint fork B301 (see FIG. 10) positioned below a joint C105, and an upward movement of the joint C105 caused by the joint fork B301 establishes a connection of the joint C105 to the needles B122. As a result thereof, an ink supplying path is formed between the ink packs C103 in the medium pack C100 and the ink supplying sections on the sub-tank on the carriage B104. Further, the main body of the printer section B100 is equipped with a suction joint B302 positioned below an air suction opening B123 (see FIG. 8) of the carriage B104 moved to the home position. This suction joint B302 is connected to a pump cylinder B304 of a pump serving as a negative pressure generating source, through a suction tube B304. The suction joint B302 is connected to the air suction opening B123 on the carriage B104 according to the upward movement caused by a joint lifter B305. In light of the foregoing, a negative pressure introducing path, between a negative pressure introducing section of the sub-tank on the carriage B104 and the pump cylinder B304, is formed. The joint lifter B305 makes the joint fork B301 move up and down together with the suction joint B302 by a driving power of the joint motor M003.

The negative pressure introducing section of the sub-tank is equipped with a gas-liquid partition member (not shown) which allows a passing through of air, but prevents a passing through of the inks. The gas-liquid partition member allows a passing through of the air in the sub-tank to be suctioned through the negative pressure introducing path, and as a result, an ink is supplied to the sub-tank from the medium pack C100. Then, when the ink is sufficiently supplied to the extent that the ink in the sub-tank reaches the gas-liquid partitioning member, the gas-liquid partitioning member prevents the passing through of the inks, thereby automatically stopping a supply of the inks. The gas-liquid partitioning member is equipped with the ink supplying section in the ink storing sections for the respective inks in the sub-tank, and thus the ink supplying is automatically stopped with respect to each ink storing section.

The main body of the printer section B100 is further equipped with a suction cap B310 capable of capping with respect to the recording head B120 (see FIG. 8) on the carriage B104 which is moved to the home position. The suction cap B310 is introduced the negative pressure thereinto from the pump cylinder B304 through suction tube B311, so that the inks can be suctioned and emitted (suction recovery processing) from the ink ejection openings B121 of the recording head B120. Further, the recording head B120, as required, effects ejection of the ink, which does not contribute to a recording of an image, into the suction cap B310 (preliminary ejection processing). The ink within the suction cap B310 is discharged into the ink absorption body C107 in the medium pack C110 from the pump cylinder B304 through a waste water liquid tube B312 and a waste liquid joint B313.

The pump cylinder B304 constitutes a pump unit B315 together with a pump motor M004 for enabling a reciprocate drive of the pump cylinder. The pump motor M004 also functions as a driving source by which a wiper lifter B316 (see FIG. 10) is moved up and down. The wiper lifter B316 makes the wiper C106 of the medium pack C100 placed in the printer section B100 move upwardly, thereby displacing the wiper C106 to a position capable of a wiping of the recording head B120.

In FIGS. 10 and 11, B321 denotes a pump HP sensor for detecting if an operating position of the pump, which is constituted by the pump cylinder B304, lies at the home position. Further, B322 denotes a joint HP sensor for detecting if the aforementioned ink supplying path and the negative pressure introducing path were formed. Still further, B323 denotes a chassis for constituting a main body of the printer section B100.

4: Signal Processing

Figure 12:
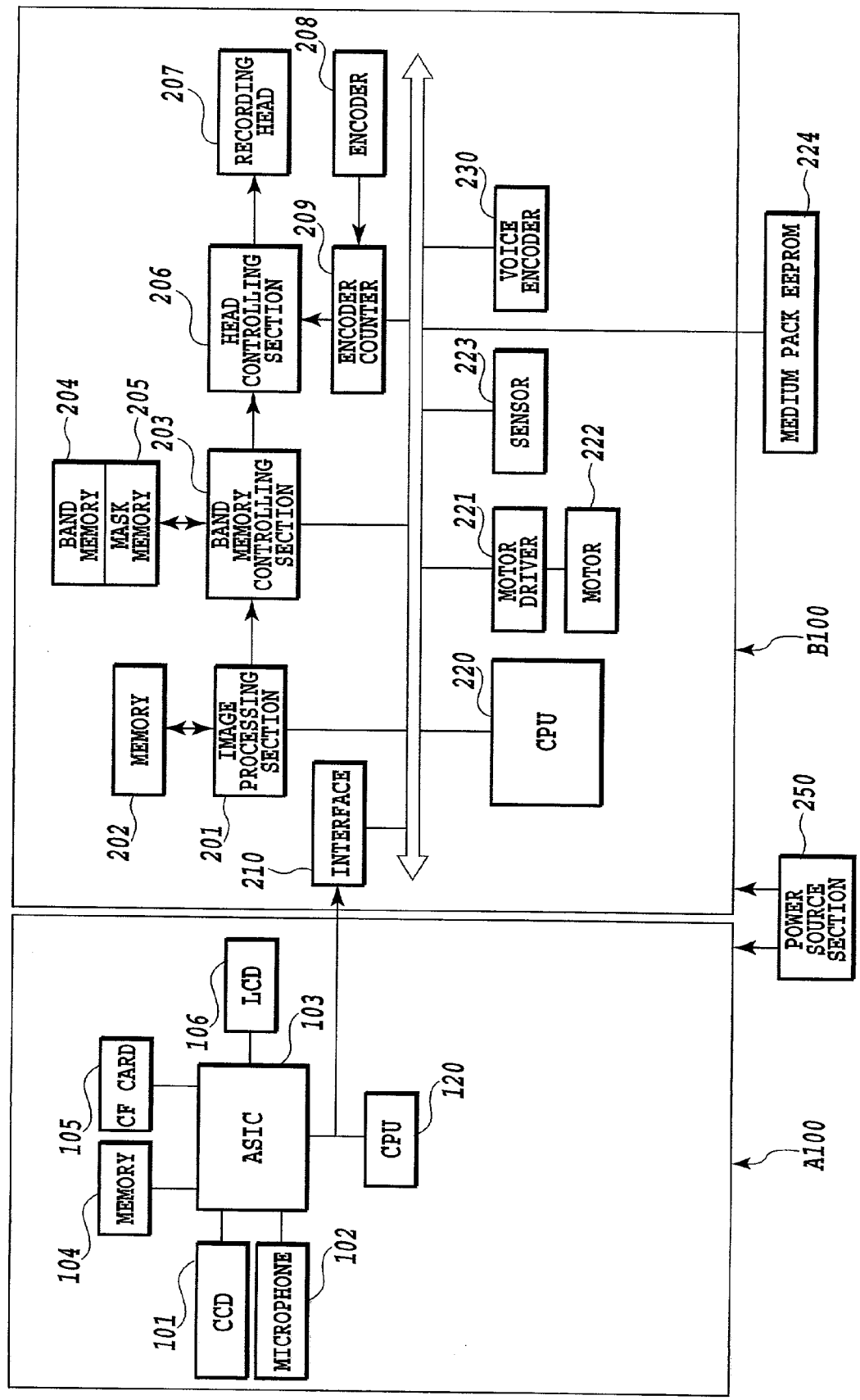
FIG. 12 is a block schematic diagram of the camera section and the printer section of the camera in FIG. 1.

FIG. 12 is a block diagram generally showing the camera section A100 and the printer section B100.

In the camera section A100, 101 denotes a CCD as an image element; 102 denotes a microphone for inputting voice; 103 denotes an ASIC (Application Specific IC) for performing various processings; 104 denotes a first memory for temporarily storing an image date and the like; 105 denotes a CF (compact flash) card (corresponding to a "CF card A107") for recording the photographed image; 106 denotes a LCD (corresponding to a "liquid crystal display section A105") which displays the photographed image or a replayed image; and 120 denotes a first CPU for controlling the camera section A100.

In the printer section B100, 210 denotes an interface between the camera section A100 and the printer section B100; 201 denotes an image processing section (including a binary processing section for binarizing an image); 202 denotes a second memory to be used in performing the image processing; 203 denotes a band memory controlling section; 204 denotes a band memory; 205 denotes a mask memory; 206 denotes a head controlling section; 207 denotes a recording head (corresponding to the "recording head B120"); 208 denotes an encoder (corresponding to the "encoder sensor B131"); 209 denotes an encoder counter; 220 denotes a second CPU for controlling the printer section B100; 221 denotes motor drivers; 222 denotes motors (corresponding to the motors M001, M002, M003 and M004"); 223 denotes sensors (including the "HP sensors B134, B321 and B322"); 224 denotes an EEPROM contained in the medium pack C100; 230 denotes a voice encoder section and 250 denotes a power source section for supplying electric power to the entire device (corresponding to the "battery A108").

Figure 13:
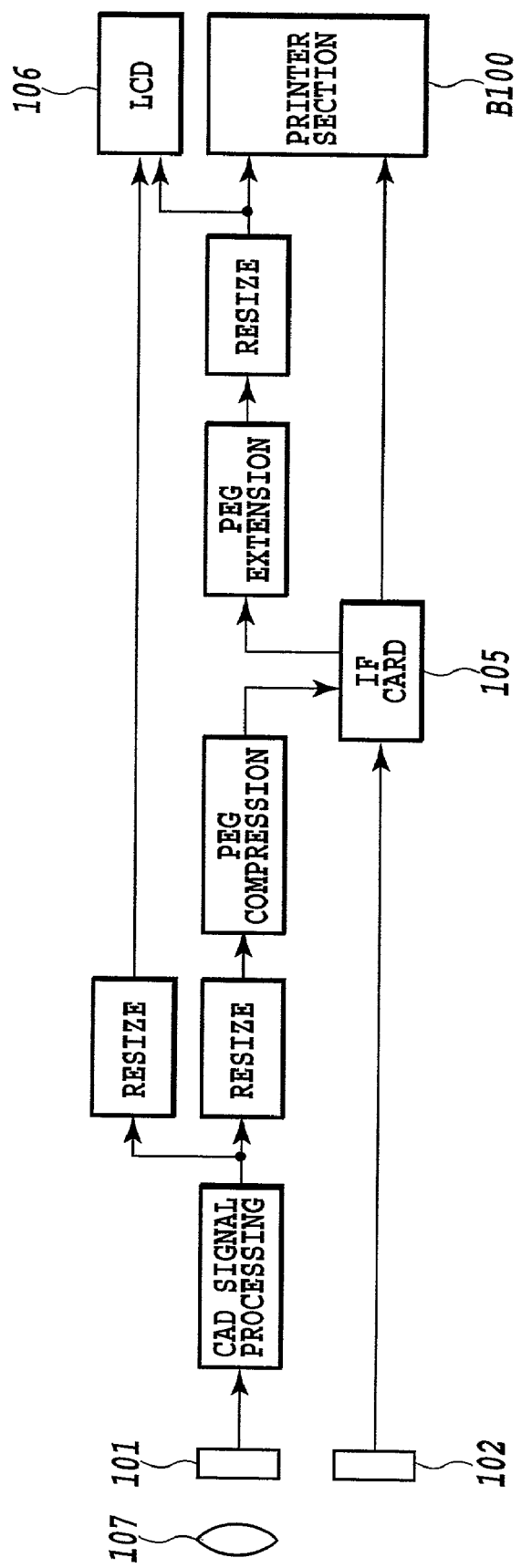
FIG. 13 is a schematic diagram of a signal processing performed in the camera section in FIG. 12.

FIG. 13 is a schematic diagram showing a signal processing in the camera section A100. In a photographing mode, an image photographed by the CCD 101 through a lens 107 is signal-processed (CCD signal processing) by ASIC 103 and then is converted to YUV intensity with two-color-different signal. Further, the photographed image is resized to a predetermined resolution and recorded on a CF card 105 using a compression method by JPEG, for example. Also, a voice is inputted through a microphone 102 and stored in the CF card 105 through the ASIC 103. A recording of the voice can be performed in such manner recording at the same time of photographing, or after photographing so called an after-recording. In a replay mode, the JPEG image is read out from the CF card 105, extended by the JPEG through the ASIC 103 and further resized to be a resolution for displaying, thereby being displayed on the LCD 106.

Figure 14:
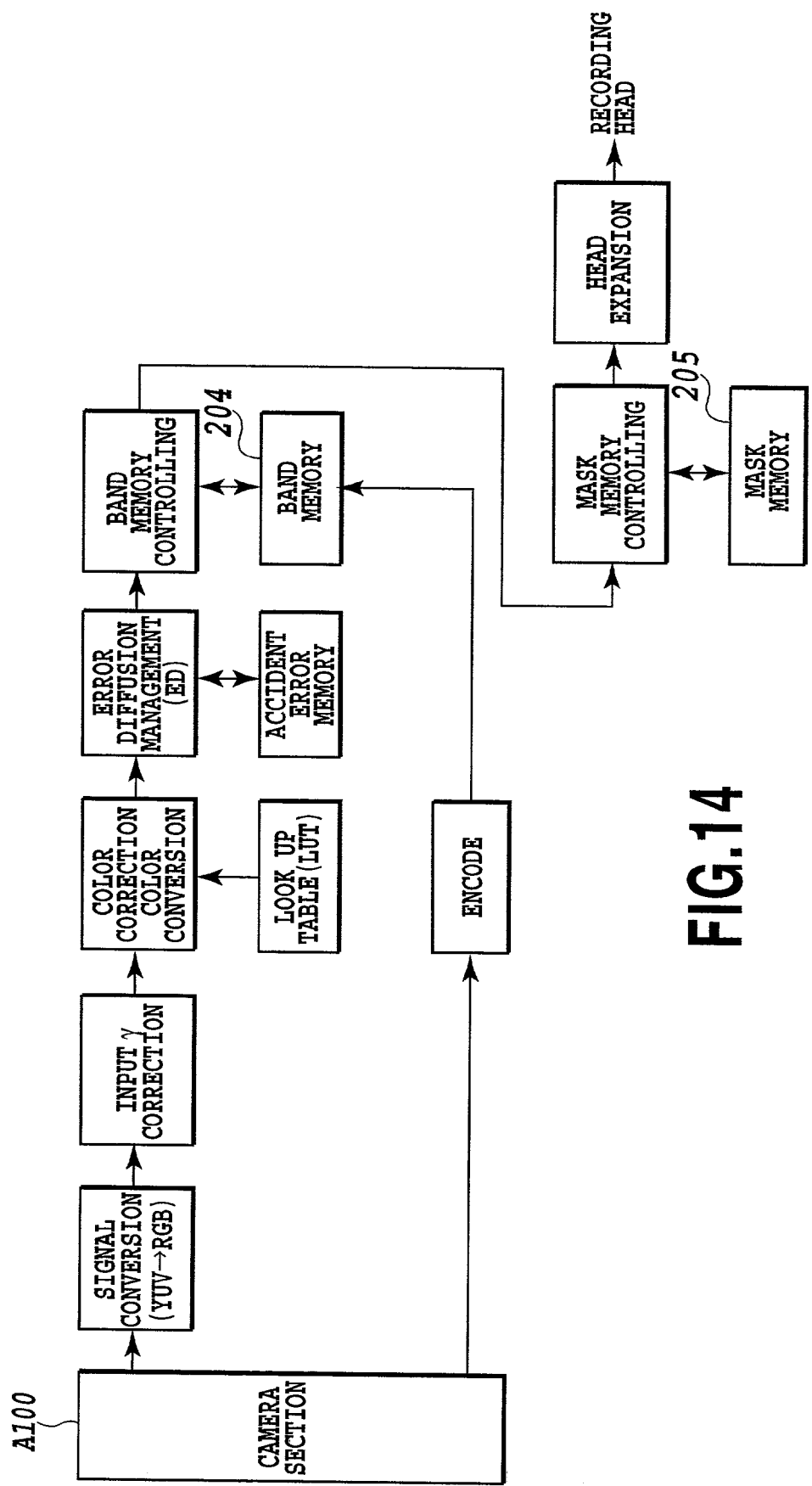
FIG. 14 is a schematic diagram of a signal processing performed in the printer section in FIG. 12.

FIG. 14 is a schematic diagram showing a signal processing performed in the printer section B100.

An image replayed on the camera section A100, that is, the image being read out from the CF card 105, is extended by the JPEG as shown in FIG. 13 to resize a resolution to a suitable size for printing. Then, the resized image data (YUV signal), through an interface section 210, is transferred to the printer section B100. As shown in FIG. 14, the printer section B100 performs an image processing of an image data transferred from the camera section A100 by an image processing section 201, thereby performing a conversion of the image data to a RGB signal, an input Y correction in accordance with the features of a camera, a color correction and a color conversion using a look up table (LUT), and a conversion to a binarized signal for printing. When performing the binarizing processing, in order to perform an error diffusion (ED), a second memory 202 is utilized as an error memory. In the case of the present embodiment, though a binarizing processing section in the image processing section 201 performs the error diffusion processing, another processing may be performed, such as binarizing processing using a dither pattern. The binarized printing data is stored temporarily in the band memory 204 by a band memory controlling section 203. An encoder pulse from the encoder 208 enters into the encoder counter 209 of the printer section B100 every time the cartridge B104 carrying the recording head 207 and the encoder 208 moves a certain distance. Then, in sync with this encoder pulse, a printing data is read out from the band memory 204 and the mask memory 205, and, based on thus obtained printing data, the head controlling section 206 controls the recording head 207 to perform recording.

A band memory shown in FIG. 14 is explained as below.

A plurality of nozzles in the recording head 207, for example, is formed in array so as to achieve a density of 1200 dpi (dots/inch). For recording the image by using such recording head 207, upon performing one scanning by the carriage, it is preferred to previously prepare a recording data (a recording data corresponding to one scanning) corresponding to the number of nozzles in the sub-scanning direction (hereinafter, also referred to as a "column (Y direction)") and a recording data corresponding to the recording area in the scanning direction (hereinafter, also referred to as a "row (X direction)"), respectively. The recording data is created in the image processing section 201 and then is temporarily stored in the band memory 204, and the carriage is scanned in the main scanning direction. In so doing, an encoder pulse inputted by the encoder 208 is counted by the encoder 209 and, in accordance with this encoder pulse, a recording data is read out from the band memory 204. Then, on the basis of the image data, ink droplets are ejected from the recording head 207. In the case that a bidirectional recording system wherein an image is recorded upon outward scanning and homeward scanning (outward recording and homeward recording) of the recording head 207 is employed, the image data is read out from the band memory 204 depending on the scanning direction of the recording head 207. For example, an address of the image data read out from the band memory 204 is increased sequentially when the outward recording is performed, while an address read out from the band memory 204 is decreased sequentially when the homeward scanning is performed.

In a practical sense, a writing of an image data (C, M and Y) created by the image processing section 201 into the band memory 204 and a subsequent preparation of the image data corresponding to one band enable a scanning of the recording head 207. Then, the image data is read out from the band memory 204 subsequent to a scan of the recording head 207, so that the recording head 207 records the image on the basis of the image data. During the recording operation, image data to be recorded next is created at the image processing section 201 and thus created image data is written into an area of the band memory 204 corresponding to a recording position.

As has been stated above, the band memory controlling is carried out in such manner that a writing operation in which an recording data (C, M, Y) created by the image processing section 201 is written into the band memory 204 and a reading operation for transferring the recording data (C, M, Y) to the head controlling section 206 in accordance with a scanning movement of the carriage are changed over.

A mask memory controlling in FIG. 14 is explained as below.

This mask memory controlling is required when a multipass recording system is employed. In using the multipass recording system, the recording image corresponding to one line which has a width corresponding to a length of the nozzle array of the recording head 207 is divided into a plurality of scans of the recording head 207 to record. That is the conveying amount of the printing medium to be intermittently carried in the sub-scanning direction is made to be 1/N of a length of the nozzle array. For example, when N=2, a recording image corresponding to one line is divided into two scans to record (two-pass recording), and when N=4, a recording image corresponding to one line is divided into four scans to record (four-pass recording). In similar fashion, when N=8, it becomes eight-pass recording, and when N=16, it becomes sixteen-pass recording. Therefore, the recording image corresponding to one line will be completed by a plurality of scans of the recording head 207.

Practically, a mask data for assigning the image data to a plurality of scans of the recording head 207 is stored in the mask memory 205, and then based on a conjunction (AND) data between the mask data and the image data, the recording head 207 ejects inks to record the image.

Also, in FIG. 14, a voice data stored in the CF card 105, alike the image data, is transferred to the printer section B100 through an interface 210 by the ASIC 102. The voice data transferred to the printer section B100 is encoded at the voice encoder 230 and then recorded with the image to be printed as a code data. When there is no necessity to input a voice data into a printing image, or when printing an image without a voice data, of course, the encoded voice data is not printed but only the image is printed.

In the present embodiment, the present invention has been explained as a printer built-in camera integral with a camera section A100 and printer section B100. However, it would be possible to make each of the camera section A100 and the printer section B100 a separate device and to form in a similar manner as a structure in which those devices are connected each other by the interface 210 to realize a similar function.

Particular embodiments of the present invention will be explained hereinafter with reference to FIGS. 15 to 17.

First Embodiment

At first, the first embodiment of the present invention will be explained with reference to FIG. 15.

In FIGS. 1 to 14, the system, in which the camera section or portion A100 and the printer section or portion B100 are integrally assembled, has been explained. However, in this embodiment and subsequent embodiments, explanation will be given in terms of the composite system, in which the camera portion A100 and the printer portion B100 are separate independent devices and connected with each other via a signal line.

Figure 15:
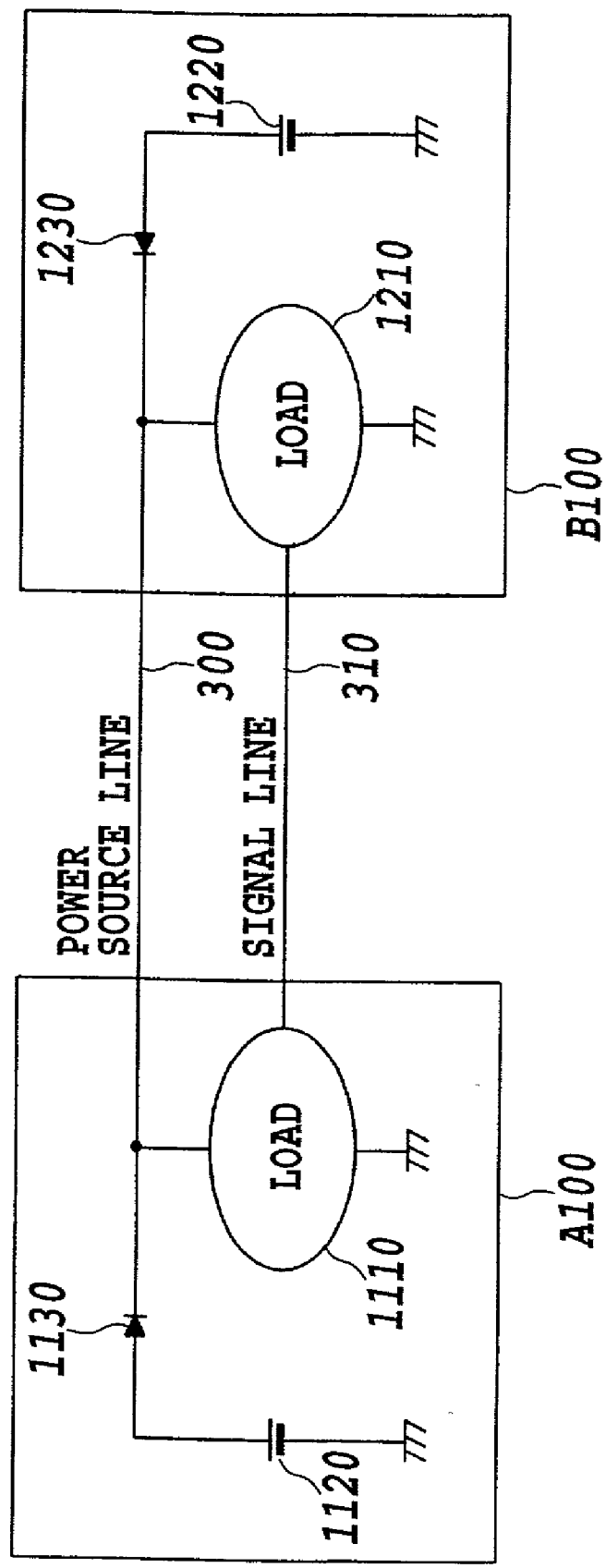
FIG. 15 is a block diagram of a composite system showing the first particular embodiment of the present invention.

FIG. 15 is a block diagram of the first particular embodiment of the present invention. In FIG. 15, reference numeral 1110 general denotes a load in the camera portion A100 corresponding to a first device, for example, which includes electrically actuated parts, such as CCD 101, a microphone 102, ASIC 103, CPU 120 and the like, as set forth above. Reference numeral 1120 denotes a battery as a first power source device provided in the camera portion A100, 1130 denotes a diode provided in a first power source line from the battery 1120 to the load 1110. On the other hand, similarly, reference numeral 1210 generally denotes a load in the printer portion B100 corresponding to a second device, for example, which includes electrically driven parts, such as CPU 220, motor 222 and the like described above. Reference numeral 1220 denotes a battery as a second power source device provided in the printer portion B100, 1230 denotes a diode provided in a second power source line from the battery 1220 to the load 1210.

Here, reference numeral 300 denotes a power source connection line as a power source device connection means for connecting the first and second power source lines, 310 denotes a signal line as a connection means for connecting the camera portion A100 and the printer portion B100 to communicate with each other such that both portions cooperate with each other.

With such construction, the camera portion A100 and the printer portion B100 are connected by the power source connection line 300 and the signal line 310. Normally, in the camera portion A100 as the first device is driven the load 1100 by the battery 1120 as the first power source device via the diode 1130. In the printer portion B100 as the second device is driven the load 1210 by the battery 1220 as the second power source device through the diode 1230.

Here, if the battery 1120 of the camera portion A100 as the first device is dead, power is supplied from the battery 1220 as the second power source of the printer portion B100 as the second device not only to the load 1210 of the printer portion B100 as the second device but also to the load 1110 of the camera portion A100 through the power source connection line 300 connecting the first and second power source lines.

On the other hand, conversely, if the battery 1220 of the power source of the printer portion B100 of the second device is dead, power is supplied from the battery 1120 of the first power source device of the camera A100 of the first device not only to the load 1110 of the camera portion A100 of the first device via the diode 1130 but also to the load 1210 of the printer portion B100 of the second device through the power source connection line 300 connecting the first and second power source lines.

As set forth above, when the battery of the power source of any one of the devices is dead, power is supplied from the battery of the power source of the other device. Therefore, even when the battery of the power source of one of the devices is dead, inconvenience that both of the devices become inoperative, can be avoided. It should be noted that while explanation has been given for the case where the battery is dead, even if the battery voltage is lowered due to exhausting of the battery of one of the devices, normal voltage of the other device is applied. Therefore, both devices are operated normally.

Second Embodiment

Figure 16:
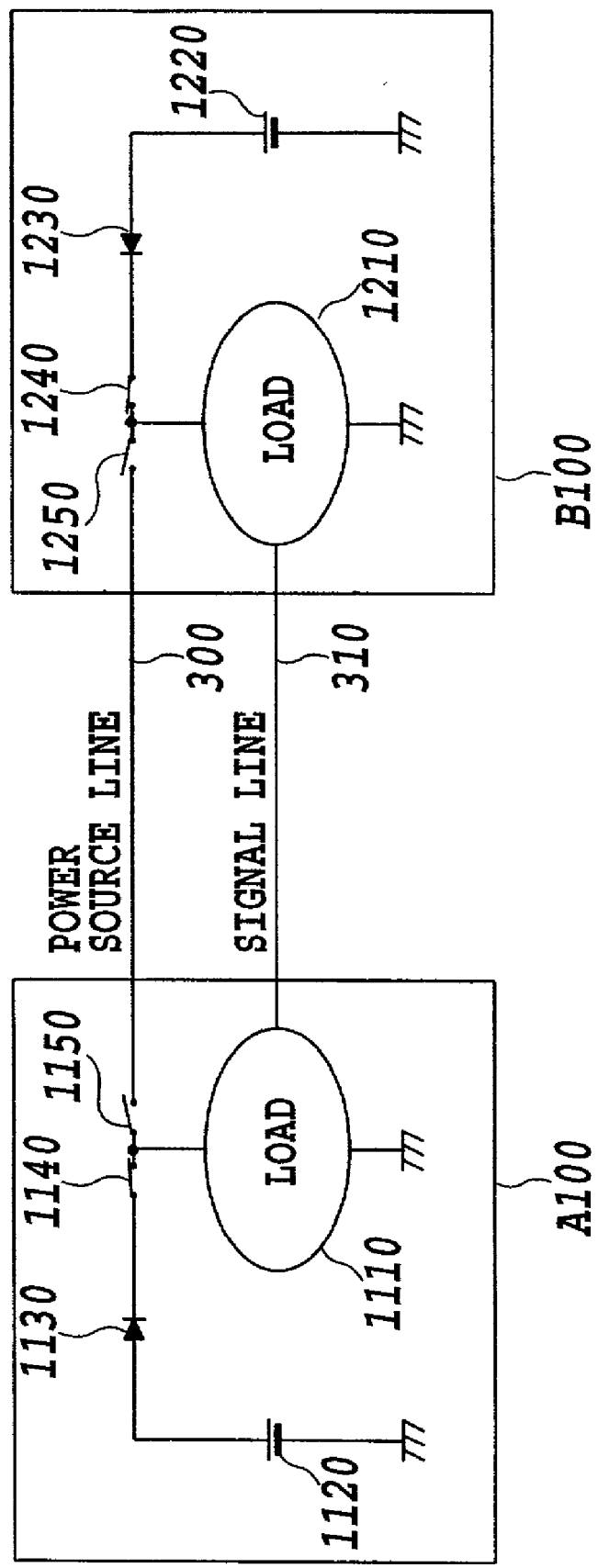
FIG. 16 is a block diagram of a composite system showing the second particular embodiment of the present invention.

FIG. 16 is a block diagram showing the second particular embodiment of the present invention.

This embodiment is differentiated from the former embodiment in that this embodiment includes a switching means for switching between an own power source device and the power source of the other device, as a driving source. Accordingly, the like components to those same as the former embodiment will be identified by like reference numerals and redundant explanation will be eliminated.

In FIG. 16, reference numeral 1140 denotes a switch provided in a first power source line of the camera portion A100 of the first device, 1150 denotes a switch provided in the power source connection line 300, both switches 1140 and 1150 form a power source selector switch of the camera portion A100 as the first device. On the other hand, reference numeral 1240 denotes a switch provided in the second power source line of the printer portion B100 of the second device, and 1250 denotes a switch provided in the power source connection line 300. Both switches 1240 and 1250 form a power source selector switch of the printer portion B100. Then, the switches 1140,1150, 1240 and 1250 form a switching means for switching between the own power source device and the power source of the other device, as a driving source.

With the construction set forth above, by appropriately switching the switches 1140, 1150, 1240 and 1250 manually or automatically with an actuation means explained later, switching of power sources becomes possible. For example, by turning the switch 1140 ON, the camera portion A100 uses its own power source (battery) 1120. At the same time, by turning the switch 1150 ON, the power of the own power source can be supplied to the other device. On the other hand, by turning the switch 1140 OFF and turning the switch 1150 ON in the condition where the switches 1240 and 1250 are ON, the power source (battery) 1220 of the printer portion B100 as the other device instead of the own power source, can be used. Similarly, on the side of the printer portion B100 as the second device, by turning the switches 1240 and 1250 ON or OFF, selection to use the own power source or to use the power source of the camera portion A100 as the other device can be made. It should be noted that setting for using the power source of the other devices on both of the first and second devices should be avoided since connection with both power sources is broken to cause an inoperative state.

Third Embodiment

Figure 17:
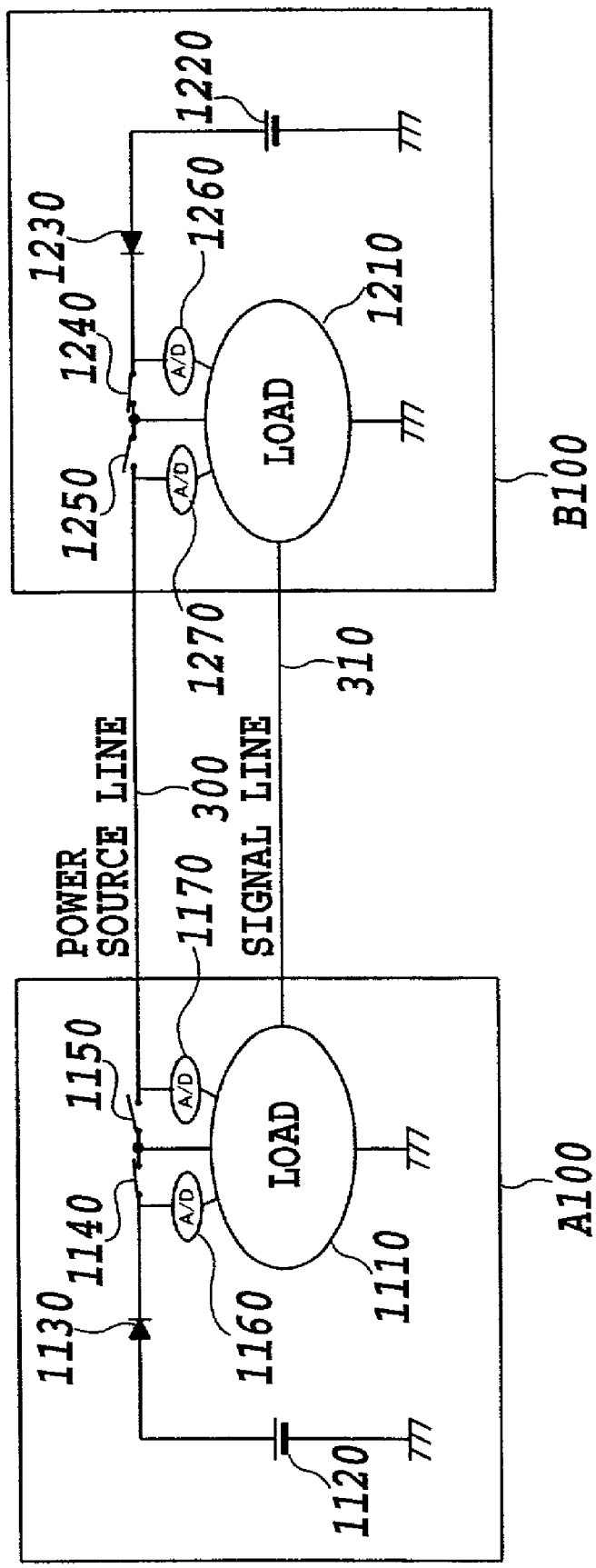
FIG. 17 is a block diagram of a composite system showing the third particular embodiment of the present invention.

FIG. 17 is a block diagram showing the third particular embodiment of the present invention.

This embodiment is mainly different from the former embodiments in that this embodiment includes a state judgment means for making judgment of states of the first and second power source devices, and an actuation means for actuating the switching means on the basis of the result of judgment made by the state judgment means. Accordingly, the like components to those same as the former embodiments will be identified by like reference numerals and redundant explanation will be eliminated.

In FIG. 17, reference numeral 1160 denotes an A/D converter provided between the first power source line on the side of the battery 1120 from the switch 1140 of the camera portion A100 of the first device and the load 1110, 1170 denotes an A/D converter provided between the power source connection line 300 on the side of the printer portion B100 from the switch 1150 and the load 1110.

On the other hand, reference numeral 1260 denotes an A/D converter provided between the second power source line on the side of the battery 1220 from the switch 1240 of the printer portion B100 as the second device and the load 1210, and 1270 denotes an A/D converter provided between the power source connection line 300 on the side of the camera portion A100 from the switch 1250 and the load 1210. Here, the A/D converters 1160 and 1260 are for detecting a state, for example, voltage, of the own power source, and the A/D converters 1170 and 1270 are for detecting a state, for example, voltage, of the power source of the other device.

With the construction set forth above, CPU 120 of the camera portion A100 obtains the voltage value of the own power source 1120 of the camera portion A100 using the digital value obtained from the A/D converter 1160 and the voltage value of the printer portion B100 as the other device using the A/D converter 1170 to make judgment of respective states. As a result of the judgment, when the own power source 1120 is exhausted to the extent that the device is inoperative but the power source 1220 of the other device has sufficient voltage, CPU 120 commands for turning the switch 1140 OFF and the switch 1150 ON to switch the power source from the own power source 1120 of the camera portion A100 to the power source 1220 of the printer portion B100 of the other device.

Similarly, CPU 220 of the printer portion B100 also obtain digital values of the voltage of the own power source 1220 and the power source 1120 of the other device using the A/D converters 1260 and 1270 to feed command to the actuation means depending upon the detected states to perform switching using the switches 1240 and 1250.

It should be noted that while the foregoing state judgment means makes judgment of the voltage state, it may be possible to make judgment by obtaining remaining life of the battery in a known manner, in place of the voltage.

The foregoing explanation has been given mainly in connection with a camera incorporating a printer, the present invention should not be limited to the shown combination, as a matter of course. Rather, the present invention is effective for the case where the camera and the printer are connected by a cable. In this case, an image is picked up by the camera, and data to be printed is fed to the printer via the signal line. Then, the power source line is included in the cable together with the signal line to enable a supply of the power source of the other device. On the other hand, as a combination of the first and second device, it should not be limited to the camera and the printer, but can be various combinations, such as a lap top PC and the printer.

Furthermore, as the foregoing power source, at least one of the first and second power source devices may be an AC adapter in place of the battery. In this case, so as to supply the power to the other device from the device having the AC adapter, the switches 1140, 1150, 1240 and 1250 may be appropriately switched.

Needless to say, in either of foregoing cases, upon switching the power source, first and second devices are reset, or in the alternative, switching is performed after checking which of battery or AC adapter is used by communication between the first and second devices in advance, and whether the other device has a capacity of supplying power and so on, by performing communication in advance.

As can be clear from the explanation set forth above, with the present invention, when a plurality of composite systems using batteries or AC adapters are used by connecting therebetween, by providing a power source line in a cable connecting the systems, operation of the overall system can be maintained even when one of the power sources is exhausted or causes failure, by supplying power from the power source of the other system. On the other hand, when respective devices are driven by an AC adapter, it becomes possible to use a plurality of devices with a single AC adapters eliminating annoyance due to use of a plurality of AC adapters.

On the other hand, by providing switches for switching the power source, instead of unconditionally switching the power sources or using the power source of the other device, the power source can be switched with checking by an operator or after checking through communication between devices. Therefore, a higher reliability can be obtained.

Furthermore, by monitoring the own power source and voltage of power source supplied by the other device, it becomes possible to switch the power supply source depending upon a degree of exhaustion of the battery. On the other hand, by monitoring the power source, the result of monitoring may be notified to the operator by way of alarm or the like.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications as fall within the true spirit of the invention.

What is claimed is:

1. A system including a first device, equipped with a first power source, operated using the first power source as a driving source and a second device, equipped with a second power source, operated using the second power source as a driving source, said system comprising:
a signal line connecting said first device and said second device so that said first and second devices communicate with each other; and
a power source line connecting said first power source and said second power source so that said first device and said second device may operate using the power source of the counterpart device as a driving source,
wherein said power source line is used in both cases of supplying power from said first power source provided in said first device to said second power source and from said second power source provided in said second device to said first power source.

2. A system as set forth in claim 1, wherein said first device is a digital camera and said second device is a printer.

3. A system as set forth in claim 1, wherein said first power source and said second power source comprise batteries.

4. A system as set forth in claim 1, wherein at least one of said first power source and said second power source comprises an AC adapter.

5. A system as set forth in claim 1, further comprising:
switching means for permitting each said first device and said second device to switch between using its own power source and the power source of the counterpart device as the driving source.

6. A system as set forth in claim 5, wherein said first device is a digital camera and said second device is a printer.

7. A system as set forth in claim 5, wherein said first power source and said second source comprise batteries.

8. A system as set forth in claim 5, wherein at least one of said first power source and said second power source comprises an AC adapter.

9. A system as set forth in claim 5, further comprising:
state judgment means for making a judgment of states of said first power source and said second power source; and
actuation means for actuating said switching means on the basis of a result of a judgment of said state judgment means.

10. A system as set forth in claim 9, wherein said state judgment means makes a judgment of voltage conditions of said first power source and said second power source.

11. A system as set forth in claim 9, wherein said state judgment means makes a judgment of a remaining life of each of said first power source and said second power source.

12. A system as set forth in claim 9, wherein said first device is a digital camera and said second device is a printer.

13. A system as set forth in claim 9, wherein said first power source and said second power source comprise batteries.

14. A system as set forth in claim 9, wherein at least one of said first power source and said second power source comprises an AC adapter.

15. A system including a first device, equipped with a first power source, operated using the first power source as a driving source, and a second device, equipped with a second power source, operated using the second power source device as a driving source, said system comprising:
a signal line connecting loads of said first device and said second device so that said first device and said second device communicate with each other; and
a power source line connecting said first power source and said second power source so that said first device and said second device can operate using the power source device of the counterpart device as the drive source,
wherein said first device includes a first line connecting said first power source and the load of said first device via a diode and said second device includes a second line connecting said second power source and the load of said second device via a diode, and
wherein said power source line connects said first line and said second line.

16. A system as set forth in claim 15, wherein said first device is a digital camera and said second device is a printer.

17. A system as set forth in claim 15, wherein said first power source and said second source comprise batteries.

18. A system as set forth in claim 15, wherein at least one of said first power source and said second power source comprises an AC adapter.

19. A system including a first device, equipped with a first power source, operated using the first power source as a driving source, and a second device, equipped with a second power source, operated using the second power source as a driving source, said system comprising:
   a signal line connecting loads of said first device and said second device so that said first device and said second device communicate with each other;
   a first line, provided in said first device, for connecting said first power source and the load of said first device via a diode;
   a second line, provided in said second device, for connecting said second power source and the load of said second device via a diode;
   a power source line connecting said first power source and said second power source so that said first device and said second device can operate using the power source of the counterpart device as the drive source, said power source line connecting said first line and said second line; and
   a plurality of switches for switching directions of power supply by said power source line,
   wherein said plurality of switches switch between a power supply from said first power source equipped in said first device to said second device and a power supply from said second power source equipped in said second device to said first device, and
   wherein said plurality of switches consist of a first switch interposed in said first line, a second switch interposed in said second line and third and fourth switches interposed in said power source line.

20. A system as set forth in claim 19, wherein said first device is a digital camera and said second device is a printer.

21. A system as set forth in claim 19, wherein said first power source and said second source comprise batteries.

22. A system as set forth in claim 19, wherein at least one of said first power source and said second power source comprises an AC adapter.

23. A system including a first device, equipped with a first power source, operated using the first power source as a driving source, and a second device, equipped with a second power source, operated using the second power source as a driving source, said system comprising:
   a signal line connecting loads of said first device and said second device so that said first device and said second device communicate with each other;
   a first line, provided in said first device, for connecting said first power source and the load of said first device via a diode;
   a second line, provided in said second device, for connecting said second power source and the load of said second device via a diode;
   a power source line connecting said first power source and said second power source so that said first device and said second device can operate using the power source of the counterpart device as the drive source, said power source line connecting said first line and said second line; and
   a plurality of switches for switching directions of power supply by said power source line, wherein said plurality of switches switch between a power supply from said first power source equipped in said first device to said second device and a power supply from said second power source equipped in said second device to said first device, and wherein said plurality of switches consist of a first switch interposed in said first line, a second switch interposed in said second line and third and fourth switches interposed in said power source line;
   a first A/D converter disposed between a junction between said first diode and said first switch and said first load, a second A/D converter disposed between a junction between said second diode and said second switch and said second load, and third and fourth A/D converters disposed between a junction between said third and fourth switches and said first and second loads, respectively; and
   actuation means for switchably actuating said first to fourth switches.

24. A system as set forth in claim 23, wherein said first device is a digital camera and said second device is a printer.

25. A system as set forth in claim 23, wherein said first power source device and said second power source comprise batteries.

26. A system as set forth in claim 23, wherein at least one of said first power source device and said second power source comprises an AC adapter.

* * * * *